United States Patent
Yamanushi et al.

(10) Patent No.: US 7,209,410 B2
(45) Date of Patent: Apr. 24, 2007

(54) SET OF ELECTRONIC APPARATUSES HAVING FIRST AND SECOND ELECTRONIC DEVICES, AND COMPUTER PROGRAM PRODUCT

(75) Inventors: Seiji Yamanushi, Kawagoe (JP); Kazuhiro Kamiya, Kawagoe (JP); Tomohisa Tsukui, Kawagoe (JP); Kazutsugu Horii, Kawagoe (JP); Tetsuya Yoshida, Kawagoe (JP); Katsuaki Kawamura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 736 days.

(21) Appl. No.: 10/463,853

(22) Filed: Jun. 18, 2003

(65) Prior Publication Data

US 2004/0042350 A1 Mar. 4, 2004

(30) Foreign Application Priority Data

Jun. 19, 2002 (JP) .............................. 2002-179142

(51) Int. Cl.
*H04B 1/20* (2006.01)
(52) U.S. Cl. .............................. 369/2; 369/7; 455/66.1; 455/74
(58) Field of Classification Search ................ 369/1–7, 369/21; 360/72.2, 48; 455/66.1, 74, 3.05, 455/345, 411; 340/7.32
See application file for complete search history.

(56) References Cited

U.S. PATENT DOCUMENTS

| | | | | |
|---|---|---|---|---|
| 4,593,155 A | | 6/1986 | Hawkins | |
| 5,109,525 A | * | 4/1992 | Nichols | 455/74 |
| 5,463,599 A | * | 10/1995 | Yifrach et al. | 369/7 |
| 5,465,240 A | * | 11/1995 | Mankovitz | 369/1 |
| 5,483,506 A | * | 1/1996 | Yoshioka et al. | 369/7 |
| 5,633,837 A | * | 5/1997 | Gantt | 369/7 |
| 5,742,893 A | | 4/1998 | Frank | |
| 5,761,159 A | * | 6/1998 | Ashenafi | 369/2 |
| 6,041,023 A | * | 3/2000 | Lakhansingh | 369/7 |
| 6,674,692 B1 | * | 1/2004 | Holland | 369/7 |
| 2002/0074413 A1 | | 6/2002 | Henzerling | |
| 2002/0173273 A1 | | 11/2002 | Spurgat et al. | |

FOREIGN PATENT DOCUMENTS

| EP | 1 107 254 A2 | 6/2001 |
|---|---|---|
| EP | 1 128 385 A1 | 8/2001 |

(Continued)

OTHER PUBLICATIONS

Japanese Office Action dated Dec. 10, 2004 regarding Japanese Patent Application No. 9-011551.

(Continued)

Primary Examiner—Ali Neyzari
(74) Attorney, Agent, or Firm—Sughrue Mion, PLLC

(57) ABSTRACT

A portable audio player (100) includes a decoder (14) and other devices for reproducing audio data, a microcomputer (16) for controlling starting and stopping the reproduction, and a radio communication device (24). An on-vehicle audio player (200) includes a radio communication device (64) for a bidirectional radio communication with the radio communication device in the portable audio player, a decoder (54) and other devices for reproducing audio data, and a microcomputer (56) for controlling starting and stopping the reproduction. In case that the portable audio player stops reproducing the audio data, the on-vehicle audio player starts reproducing the audio data.

25 Claims, 7 Drawing Sheets

FOREIGN PATENT DOCUMENTS

| | | |
|---|---|---|
| EP | 1 267 523 A1 | 12/2002 |
| JP | 1-145779 | 6/1989 |
| JP | 2-142281 | 5/1990 |
| JP | 4-506292 | 10/1992 |
| JP | 4-334165 | 11/1992 |
| JP | 5-298043 | 11/1993 |
| JP | 6-348804 | 12/1994 |
| JP | 7-093520 | 4/1995 |
| JP | 7-123369 | 5/1995 |
| JP | 7-152508 | 6/1995 |
| JP | 7-249993 | 9/1995 |
| JP | 7-302270 | 11/1995 |
| JP | 7-306933 | 11/1995 |
| WO | WO 91/15078 | 10/1991 |
| WO | WO 02/43252 A2 | 5/2002 |

OTHER PUBLICATIONS

U.S. Patent Application No. 234,788 (JPA 2-142281 claims priority from this application; a copy of the application in not publicly available).

* cited by examiner

| | ID NUMBER | MODEL | CONNECTION REQUIREMENT |
|---|---|---|---|
| SELF-INFORMATION | ×××× | aaaa | AUTOMATIC CONNECTION MODE |
| ACCEESSIBLE APPARATUS NO1 | ○○○○ | bbbb | TOP PRIORITY FOR CONNECTION |
| ACCEESSIBLE APPARATUS NO2 | ◎◎◎◎ | bbbb | TOP PRIORITY FOR CONNECTION |
| ACCEESSIBLE APPARATUS NO3 | △△△△ | cccc | DOWNMIX REQUIRED FOR STEREO SYSTEM |
| ACCEESSIBLE APPARATUS NO4 | □□□□ | dddd | USER INQUIRY REQUIRED |
| ...... | ... | ... | ... |

FIG. 7

SET OF ELECTRONIC APPARATUSES HAVING FIRST AND SECOND ELECTRONIC DEVICES, AND COMPUTER PROGRAM PRODUCT

BACKGROUND OF THE INVENTION

1. Field of the Invention

The present invention relates to a set of electronic apparatuses including a first electronic apparatus for portable use with a recording medium for storing contents information, such as a CD (Compact Disc), an MD (Mini Disc), a DVD, a hard disk, a memory stick, a memory card or the like, and a second electronic apparatus disposed separately from the first electronic apparatus, such as an on-vehicle player, a stationary player etc., or for the portable use. The present invention further relates to the first and second electronic apparatuses for forming together the set of electronic apparatuses. The present invention further relates to a computer program product for serving a computer as a controlling device for the first or second electronic apparatus.

2. Description of the Related Art

There are a portable CD player, a portable MD player, a portable DVD player and the like, allowing listening to or watching contents information such as audio information, video information or the like in the open air or other situations. In a situation that the user enjoying contents information in the open air with such a kind of portable player gets into a car on which the on-vehicle player is mounted or moves into a house in which the stationary player is disposed, the reproduction of the contents information is generally in the middle of listening or watching.

If the user desires to continue listening to or watching the contents information in mid course of the reproduction, the user has to take the recording medium such as a CD, an MD or a DVD out of the portable player to then load it into the on-vehicle player or the stationary player, after entering the car or the house. Then the user has to search for the point or the neighboring area, at which the contents information was lastly listened to or watched, through a fast-forwarding function or a chapter searching function. Furthermore, the user performs an operation to resume or start reproducing the contents information approximately from the searched point.

Alternatively, the user may attach a FM transmitter, which is typically inserted into the earphone jack instead of an earphone, to the portable player. Alternatively, the user may switch the portable player into a FM transmitting mode, if the player is a type included in the FM transmitter. Thereby, the reproduction output from the portable player is transmitted in the FM wave. Moreover, the user performs tuning the on-vehicle player or the stationary player to a certain FM frequency corresponding to the transmission from the FM transmitter, before or after setting the on-vehicle player or the stationary player into a FM receiving mode. Thereby, the reproduction in the on-vehicle or stationary player is resumed or started approximately from the point at which the reproduction of the contents information was lastly reproduced.

However, the combination of the portable player and the on-vehicle or stationary player involving taking out and loading the recording medium forces the great effort or the troublesome manipulation on the user. Particularly, searching for the contents information in mid course of reproduction is further complicated in the case of the CD, the MD or the DVD, i.e. random access type recording media, than the case of cassette tapes.

On the other hand, with regard to the combination of the portable player and the on-vehicle or stationary player involving switching the audio output via the FM transmitter set forth above, searching for the contents information in mid course of the reproduction is also complicated, because of the mounting of the FM transmitter, or the mode setting or the frequency tuning of the on-vehicle or stationary player.

SUMMARY OF THE INVENTION

Therefore, the present invention has accomplished in view of the above problem for example. It is therefore an object of the present invention to provide a set of electronic apparatuses including a first electronic apparatus and a second electronic apparatus, which allows that the second electronic apparatus such as the on-vehicle or stationary player can reproduce the contents information, which is under reproduction in the first electronic apparatus such as the portable player, automatically or with relatively simple operation, as well as the first and second electronic apparatuses for forming together the set of electronic apparatuses, and a computer program product for serving a computer as a controlling device for the first or second electronic apparatus.

The above object of the present invention can be achieved by a set of electronic apparatuses having a first electronic apparatus and a second electronic apparatus, the first electronic apparatus having: a first reproducing device for reproducing contents information; a first controlling device for controlling starting and stopping a reproduction in the first reproducing device; and a first communication device for a radio communication, the second electronic apparatus having: a second communication device for a bidirectional radio communication with the first communication device; a second reproducing device for reproducing the contents information; and a second controlling device for controlling starting and stopping a reproduction in the second reproducing device; wherein a control signal is transferred between the first and second controlling devices via the first and second communication devices so that the second reproducing device starts reproducing the contents information under control of the second controlling device, in case that the first reproducing device stops reproducing the contents information under control of the first controlling device.

According to the set of electronic apparatuses of the present invention, the first electronic apparatus may be a mobile player such as a portable player capable of reproducing the contents information such as audio and/or video information. On the other hand, the second electronic apparatus may be an on-vehicle player such as a car stereo, a rear entertainment system or the like capable of reproducing the contents information such as audio and/or video information, or may be a stationary player such as a component stereo system, a home theater system or the like capable of reproducing the contents information such as audio and/or video information.

In the operation, first of all, the first reproducing device in the first electronic apparatus starts reproducing the contents information under control of the first controlling device. Thereby, the user can enjoy the contents information via the earphone or headphone while walking for example. Additionally or alternatively, the user can enjoy the contents information with a compact screen for example. The first reproducing device stops reproducing the contents information under control of the first controlling device automatically or by a predetermined user's operation, if the user carrying the first electronic apparatus come closer to the second electronic apparatus during the reproduction in the first electronic apparatus, as in various aspects to be discussed below. Under this circumstance, a control signal is transferred between the first and second controlling devices via the first and second communication devices, so that the second reproducing device in the second electronic apparatus starts reproducing the contents information, as the first reproducing device in the first electronic apparatus stops reproducing the contents information.

Therefore, the user can enjoy the contents information continuously with the second electronic apparatus without or substantially without a bothersome manual operation, even in the case that the user enjoying the contents information with the first electronic apparatus such as the portable player in the open air gets into a car on which the second electronic apparatus is mounted such as the on-vehicle player, or moves into a house in which the second electronic apparatus is disposed such as the stationary player.

Particularly, the present invention is very convenient for the user, because that the contents information can be reproduced in the second electronic apparatus from a stop point at which the reproduction of the contents information in the first electronic apparatus has been stopped, without searching for the stop point in the second electronic apparatus, even in the case of CDs, MDs, DVDs, i.e. random access recording media.

In one aspect of the set of electronic apparatuses according to the present invention, the first electronic apparatus is further provided with a first recording medium for storing the contents information, the first reproducing device reads the contents information stored in the first recording medium to reproduce the contents information, upon reproducing the contents information, the first communication device reads the contents information stored in the first recording medium to transmit the contents information to the second communication device, in case that the first reproducing device stops reproducing the contents information, and the second reproducing device reproduces the contents information received at the second communication device.

According to this aspect, first of all, the contents information stored in the first recording medium is read and reproduced under control of the first controlling device in the first electronic apparatus. Once the reproduction of the contents information in the first reproducing device is stopped (e.g. automatically), for example, resulting from approaching the second electronic apparatus during the reproduction in the first electronic apparatus, the contents information stored in the first recording medium is read and transmitted from the first communication device to the second communication device. The received contents information, in turn, is reproduced by the second reproducing device. Thus, the reproducing device for outputting the reproduced contents information can be switched effectively from the first reproducing device to the second reproducing device, while the source of the contents information is maintained. Moreover, in this arrangement, the reproduction in the second reproducing device can be resumed or started, without complicated technique, from a stop point at which the reproduction in the first reproducing device has been stopped, without giving a special attention to the stop point.

The first recording medium according to the invention may be a removable recording medium such as a CD, a DVD, an MD or the like, or a non-removable recording medium such as a hard disk, a RAM or the like. In the latter case, the technical effect of the present invention is remarkable, taking account of the difficulty in removing the recording medium itself and attaching it to the second electronic apparatus. It is noted that the technical effect of the present invention is clearly distinct from the prior art, also in the former case.

The transmission of the contents information may be executed in a desired unit such as an amount of data within a predetermined time range (e.g. a few seconds or minutes), music composition by music composition, or album by album, and may be executed regularly or irregularly.

In this aspect, the second electronic apparatus may be provided with a second recording medium for storing the contents information received at the second communication device, and the second reproducing device reproduces the contents information stored in the second recording medium.

By constructing it in this manner, the second recording medium can be used as a buffer memory (may also merely called as a "buffer") for temporarily and sequentially storing the contents information transmitted in a unit of a predetermined time range such as a few seconds or minutes into the second recording medium. Simultaneously or with a slight delay to the storing, by reproducing the contents information sequentially, the apparatus for outputting the contents information can be readily switched from the first electronic apparatus to the second electronic apparatus. Alternatively, the contents information transmitted music composition by music composition, or album by album can be stored into the second recording medium. That is, before or after switching the electronic apparatus, by duplicating the contents information from the first recording medium into the second recording medium insofar as any problem in the copyright is avoided for example, the reproduction in the second electronic apparatus can be executed independently of the first electronic apparatus, in addition to the smooth switching of the electronic apparatus.

In another aspect of the set of electronic apparatuses according to the present invention, the second reproducing device starts reproducing the contents information without a discretion of the contents information, in case that the first reproducing device stops reproducing the contents information.

According to this aspect, switching from the first reproducing device to the second reproducing device to reproduce the contents information without the discretion of the reproduced contents information allows the user, for example who moves into the car from the outside, to enjoy the contents information comfortably.

Providing the second recording medium acting as a buffer for the second electronic apparatus, as the precedent aspect, technically facilitates starting the reproduction of the contents information without the discretion of the reproduced contents information Even in the case of the second electronic apparatus without the second recording medium, however, transmitting the contents information in mid course of the reproduction no later than (i.e. "a little ahead of" or "without delay") the reproduction itself technically allows starting the reproduction of the contents information without the discretion of the reproduced contents information. In practice, it is sufficient that the discretion of the reproduced contents information is within a time range insensible or negligible to the user.

In another aspect of the set of electronic apparatuses according to the present invention, the second reproducing device starts reproducing the contents information with an overlap of the contents information by a predetermined amount, or the second reproducing device starts reproducing the contents information at a beginning of a predetermined unit, which includes a stop point at which the reproduction of the contents information is stopped, in case that the first reproducing device stops reproducing the contents information.

According to this aspect, switching the reproducing device from the first reproducing device to the second reproducing device with the overlap of the reproduced contents information, otherwise resuming the reproduction of the contents information in mid course of the reproduction, such as a music composition in mid course of the reproduction, from the head thereof can prevent the user, for example who moves into the car from outside, from missing a part of the contents information during the user's action, such as removing the headphone or so.

In another aspect of the set of electronic apparatuses according to the present invention, a communicational connection is established between the first communication device and the second communication device, in case that the first electronic apparatus and the second electronic apparatus come closer to one another to be within a predetermined range of distance therebetween, and the control signal is transferred, once the communicational connection is established.

According to this aspect, during the time the first electronic apparatus is turned on or the first electronic apparatus is reproducing the contents information, the first communication device monitors, regularly or irregularly, the existence of the accessible second electronic apparatus in the predetermined range, such as a range accessible via a communicational radio wave. In turn, during the time the second electronic apparatus is turned on, the second communication device monitors, regularly or irregularly, the existence of the accessible first electronic apparatus in the predetermined range, such as a range accessible via a communicational radio wave. If the first and second electronic apparatuses come closer to one another to be within the predetermined range of distance therebetween, the communicational connection is established between the first and second communicational devices. Once the communicational connection is established, the control signal is transferred between the first and second controlling devices. Thereby, the second reproducing device starts reproducing the contents information, as the first reproducing device stops reproducing the contents information. This arrangement is therefore very convenient for the user, because that the apparatus for outputting the reproduced contents information can be switched automatically from the first electronic apparatus to the second electronic apparatus, when the user gets into the car or comes back to the home.

The communicational connection between the first and second communication devices may be accomplished on the basis of a communication protocol, such as the Bluetooth.

In another aspect of the set of electronic apparatuses according to the present invention, if an approach status between the first electronic apparatus and the second electronic apparatus is detected in accordance with a predetermined standard, the control signal is transferred so that the first reproducing device stops reproducing the contents information and the second reproducing device starts reproducing the contents information.

According to this aspect, during the time the first electronic apparatus is turned on or the first electronic apparatus is reproducing the contents information, the first communication device or other detecting devices provided to the first electronic apparatus, and/or the second communication device or other detecting devices provided to the second electronic apparatus monitors, regularly or irregularly, the approach status between the first electronic apparatus and the second electronic apparatus, in accordance with the predetermined standard. If the approach status between the first and second electronic apparatuses is detected, the control signal is transferred between the first and second controlling devices, so that the second reproducing device starts reproducing the contents information, as the first reproducing device stops reproducing the contents information. This arrangement is therefore very convenient for the user, because that the apparatus for outputting the reproduced contents information can be switched automatically from the first electronic apparatus to the second electronic apparatus, when the user gets into the car or comes back to the home.

In this aspect, at least one of the first and second controlling devices may detect the approach status between the first and second electronic apparatuses, on the basis of a communicational status between the first and second communication devices.

By constructing it in this manner, the approach status between the first and second electronic apparatuses, for example, an approach status within a few meters, can be detected, on the basis of the communicational status between the first and second communication devices, such as the intensity of the radio wave transferred between the first and second communication devices after the establishment of the communicational connection. This arrangement is therefore convenient, because that the first and second communication devices can be used also as detecting devices for detecting the approach status.

It is possible, however, that a known detecting device for electromagnetically, optically or physically detecting the approach status, such as a transmitter and a receiver sensitive to a certain electromagnetic wave is provided, instead of the first and second communication devices.

In another aspect of the set of electronic apparatuses according to the present invention, at least one of the first and second electronic apparatuses is further provided with a detecting device for detecting a predetermined trigger event, and once the predetermined trigger event is detected, the control signal is transferred so that the first reproducing device stops reproducing the contents information and the second reproducing device starts reproducing the contents information.

According to this aspect, the trigger event is detected in the second electronic apparatus, which may be a generation of light, sound, vibration or the like indicating the appearance of human in the vicinity of the second electronic apparatus, otherwise a main power supply to the second electronic apparatus. Then, the control signal is transferred between the first and second controlling devices, so that the second reproducing device starts reproducing the contents information, as the first reproducing device stops reproducing the contents information. This arrangement is therefore very convenient for the user, because that the apparatus for outputting the reproduced contents information can be switched automatically or with a simple manipulation from the first electronic apparatus to the second electronic apparatus, when the user gets into the car or comes back to the home.

The trigger event may be a command input to at least one of the first and second electronic apparatuses, such as a certain command input by sound or by pressing a certain functional button.

In another aspect of the set of electronic apparatuses according to the present invention, the first electronic apparatus is further provided with a first non-volatile memory for storing an identification code for identifying one or more the second electronic apparatuses, and the first communication device establishes a radio communication with the second communication device, on the basis of the identification code stored in the first non-volatile memory.

According to this aspect, the first electronic apparatus can establish the communicational connection between the predetermined first and second communication devices, such as a pair of communication devices forming the set of electronic apparatuses of the user's own, on the basis of the identification code, stored in the first non-volatile memory, for identifying one or more second electronic apparatuses. Conversely, the danger of misconnecting can be reduced, even in the case that the first electronic apparatus of the user's own come closer to a second electronic apparatus of the third party's own.

In this aspect, the first non-volatile memory may store a connection requirement data, which defines a connection requirement for the connection with the second electronic apparatus, in correlation with the identification code.

By constructing it in this manner, a desired pair of the first and second electronic apparatuses among a plurality of first and second electronic apparatuses is provided as the set of electronic apparatuses, on the basis of the connection requirement data stored (e.g. in a table form) in correlation with the identification code in the first non-volatile memory. More specifically, in the case that a pair of one first electronic apparatus and either one of multiple second electronic apparatuses is provided as the set of electronic apparatuses, the connection requirement, such as the priority order of the second electronic apparatus for transferring the control signal, while the multiple second electronic apparatuses are accessible from the first electronic apparatus, is set. Thereby, the desired pair among multiple first and second electronic apparatuses can be provided as the set of electronic apparatuses. In addition to the priority order, various connection requirements, such as a predetermined range of the approach status in the precedent aspect, a limitation of accessible models, mode setting for the automatically switching of the connection may be set.

In another aspect of the set of electronic apparatuses according to the present invention, the second electronic apparatus is further provided with a second non-volatile memory for storing an identification code for identifying one or more the first electronic apparatuses, and the second communication device establishes a radio communication with the first communication device, on the basis of the identification code stored in the second non-volatile memory.

According to this aspect, the second electronic apparatus can establish the communicational connection between the predetermined first and second communication devices, such as a pair of communication devices forming the set of electronic apparatuses of the user's own, on the basis of the identification code, stored in the second non-volatile memory, for identifying one or more first electronic apparatuses. Conversely, the danger of misconnecting can be reduced, even in the case that the second electronic apparatus of the user's own comes in the vicinity of a first electronic apparatus of the third party's own.

In this aspect, the second non-volatile memory may store a connect requirement data, which defines a connection requirement for the connection with the first electronic apparatus, in correlation with the identification code.

According to this arrangement, a desired pair of the first and second electronic apparatuses among a plurality of first and second electronic apparatuses can be provided as the set of electronic apparatuses, on the basis of the connection requirement data stored (e.g. in a table form) in correlation with the identification code in the second non-volatile memory. More specifically, in the case that a pair of either one of multiple first electronic apparatuses and one second electronic apparatus is provided as the set of electronic apparatuses, the connection requirement, such as the priority order of the first electronic apparatus for transferring the control signal, while the multiple first electronic apparatuses are accessible from the second electronic apparatus, is set. Thereby, the desired pair among multiple first and second electronic apparatuses can be provided as the set of electronic apparatuses. In addition to the priority order, various connection requirements, such as a predetermined range of the approach status in the precedent aspect, a limitation of accessible models, mode setting for the automatically switching of the connection may be set.

In another aspect of the set of electronic apparatuses according to the present invention, if a separation status between the first electronic apparatus and the second electronic apparatus is detected in accordance with a predetermined standard, the first reproducing device re-starts reproducing the contents information and the second reproducing device stops reproducing the contents information.

According to this aspect, during the time the first electronic apparatus is turned on, the first communication device or other detecting devices provided to the first electronic apparatus, and/or the second communication device or other detecting devices provided to the second electronic apparatus monitors, regularly or irregularly, the separation status between the first electronic apparatus and the second electronic apparatus, in accordance with the predetermined standard. If the separation status between the first and second electronic apparatuses is detected, the second reproducing device stops reproducing the contents information, and the first reproducing device restarts reproducing the contents information. This arrangement is therefore very convenient for the user, because that the apparatus for outputting the reproduced contents information is switched automatically from the second electronic apparatus to the first electronic apparatus, when the user moves into the open air from the car or the house.

The separation status between the first and second electronic apparatuses may be detected by at least one of the first and second controlling devices, on the basis of the communicational status between the first and second communication devices. More specifically, the separation status between the first and second electronic apparatuses, for example, a separation status more than a few meters, may be detected, on the basis of the communicational status between the first and second communication devices, such as the intensity of the radio wave transferred between the first and second communication devices. This arrangement is therefore convenient, because that the first and second communication devices can be used also as detecting devices for detecting the separation status.

It is possible, however, that a known detecting device for electromagnetically, optically or physically detecting the separation status, such as a transmitter or receiver sensitive to a certain electromagnetic wave is provided, instead of the first and second communication devices. Furthermore, such a detecting device for detecting the separation status may be served also as the detecting device for detecting the approach status as appropriate.

In another aspect of the set of electronic apparatuses according to the present invention, if the first and second electronic apparatuses separate from one another departing from a predetermined range of distance therebetween, the communicational connection between the first and second communication devices is cut, and once the communicational connection is cut, the first reproducing device re-starts reproducing the contents information and the second reproducing device stops reproducing the contents information.

According to this aspect, during the time the first electronic apparatus is turned on, the first communication device monitors, regularly or irregularly, the deviation of the second electronic apparatus from the predetermined range, such as a range accessible via a communicational radio wave. In turn, during the time the second electronic apparatus is turned on, the second communication device monitors, regularly or irregularly, the deviation of the first electronic apparatus from the predetermined range, such as a range accessible via a communicational radio wave. If the first and second electronic apparatuses separate from one another over the predetermined range of distance therebetween, the communicational connection between the first and second communicational devices is cut. Then, the second reproducing device stops reproducing the contents information, and the first reproducing device re-starts reproducing the contents information. This arrangement is therefore very convenient for the user, because that the apparatus for outputting the reproduced contents information is switched automatically from the second electronic apparatus to the first electronic apparatus, when the user moves into the open air from the car or the house.

The communicational connection between the first and second communication devices may be accomplished on the basis of a communication protocol, such as the Bluetooth.

The above object of the present invention can be also achieved by another set of electronic apparatuses having a first electronic apparatus and a second electronic apparatus, the first electronic apparatus including: a first reproducing device for reproducing contents information; a first controlling device for controlling starting and stopping a reproduction in the first reproducing device; and a first communication device for a radio communication, the second electronic apparatus including: a second communication device for a bidirectional radio communication with the first communication device; a second reproducing device for reproducing the contents information; and a second controlling device for controlling starting and stopping a reproduction in the second reproducing device; wherein the first electronic apparatus further comprises a first recording medium for storing a stop point information, which indicates a stop point at which the reproduction of the contents information has been stopped, a communicational connection is established, if the first and second electronic apparatuses come closer to one another to be within a predetermined range of distance therebetween, once the communicational connection is established, the first communication device transmits at least the stop point information to the second communication device, the second communication device receives at least the stop point information, and the second reproducing device starts reproducing the contents information under control of the second controlling device, at the stop point obtained from the stop point information received at the second communication device.

According to this another set of electronic apparatuses of the present invention, in the operation, first of all, the first reproducing device in the first electronic apparatus starts reproducing the contents information under control of the first controlling device. Thereby, the user can enjoy the contents information via the earphone or headphone while walking. Additionally or alternatively, the user can enjoy the contents information with a compact screen. The user may stop the reproduction of the contents information at a desired point during the reproduction. For example, the reproduction may be stopped by the user, when the user enters a noisy area, meets someone or talks with someone. At this stage, the stop point information indicating the stop point is stored into the first recording medium. After that, the communicational connection is established automatically or with a predetermined user's manipulation, when the user comes in the vicinity of the second electronic apparatus, as various aspects discussed above. Then, the stop point information is transmitted from the first communication device to the second communication device, so that the second reproducing device in the second electronic apparatus starts reproducing the contents information under control of the second controlling device, at the stop point obtained from the stop point information received at the second communication device.

Therefore, the user can enjoy the contents information continuously with the second electronic apparatus without or substantially without a bothersome manual operation, even in the case that the user enjoying the contents information with the first electronic apparatus such as the portable player in the open air stops the reproduction of the contents information in mid course of the reproduction and then gets into a car mounted the second electronic apparatus such as the on-vehicle player, or moves into a house disposed the second electronic apparatus such as the stationary player therein.

In one aspect of this another set of electronic apparatuses according to the present invention, the first recording medium stores the contents information in correlation with the stop point information, once the communicational connection is established, the first communication device transmits the contents information with the stop point information, the second communication device receives the contents information transmitted from the first communication device, and the second reproducing device starts reproducing the contents information received at the second communication device, from the stop point.

According to this aspect, once the communicational connection is established between the first and second communication devices, the contents information stored in the first recording medium is transmitted with the stop point information. Furthermore the received contents information is reproduced from the stop point obtained from received the stop point information. Therefore, the apparatus for outputting the reproduced contents information can be switched from the first reproducing device to the second reproducing device, while the source of the contents information is maintained.

This another set of electronic apparatuses according to the present invention can be embodied in various aspects corresponding to various aspects in the precedent set of electronic apparatuses according to the present invention.

The above object of the present invention can be also achieved by a computer program product in a computer-readable medium for tangibly embodying a program of instructions executable by a computer to make the computer function as at least one of the first electronic apparatus and the second electronic apparatus for forming the above described set of electronic apparatuses of the present invention According to the computer program product of the present invention, the first or second controlling device according to the present invention set forth above can be embodied relatively readily, by loading the computer program product from the recording medium for storing the computer program product, such as a ROM, CD-ROM, DVD-ROM, hard disk or the like, into the computer, or downloading the computer program product, which may be a carrier wave, into the computer via a communication device. More concretely, the computer program product may comprise computer readable codes to cause the computer (or may comprise computer readable instructions for causing the computer) to function as respective one of the first reproducing device, the first controlling device, the first communication device and so forth in the above described first electronic apparatus, and/or to function as respective one of the second communication device, the second reproducing device, the second controlling device and so forth in the above described second electronic apparatus.

The above object of the present invention can be also achieved by the first electronic apparatus of the above described set of electronic apparatuses of the present invention.

According to the first electronic apparatus of the present invention, the same technical effect as that of the set of electronic apparatuses of the present invention set forth above is obtained, when used pairwisely with the second electronic apparatus set forth above. Relating to this, the first electronic apparatus may be manufactured or sold by itself, otherwise used by itself.

The first electronic apparatus according to the present invention can be embodied in various aspects corresponding to precedent various aspects in the precedent set of electronic apparatuses according to the present invention.

The above object of the present invention can be also achieved by the second electronic apparatus of the above described set of electronic apparatuses of the present invention.

According to the second electronic apparatus of the present invention, the same technical effect as that of the precedent set of electronic apparatuses of the present invention, by using pairwisely with the first electronic apparatus set forth above. Relating to this, the second electronic apparatus may be manufactured or sold by itself, otherwise used by itself.

The second electronic apparatus according to the present invention can be embodied in various aspects corresponding to precedent various aspects in the precedent set of electronic apparatuses according to the present invention.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 7 is a conceptual diagram showing a connection authentication table constructed within the non-volatile memory used in a set of electronic apparatuses according to a fifth embodiment of the present invention.

DETAILED DESCRIPTION OF THE PREFERRED EMBODIMENTS

The embodiments of the present invention will now be discussed, referring to drawings. In embodiments as discussed below, the set of electronic apparatuses consists of the first electronic apparatus and the second electronic apparatus: the first electronic apparatus is embodied in a portable audio player capable of reproducing audio data as an example of contents information, and the second electronic apparatus is embodied in an on-vehicle audio player capable of reproducing audio data as well.

(First Embodiment)

Figure 1:
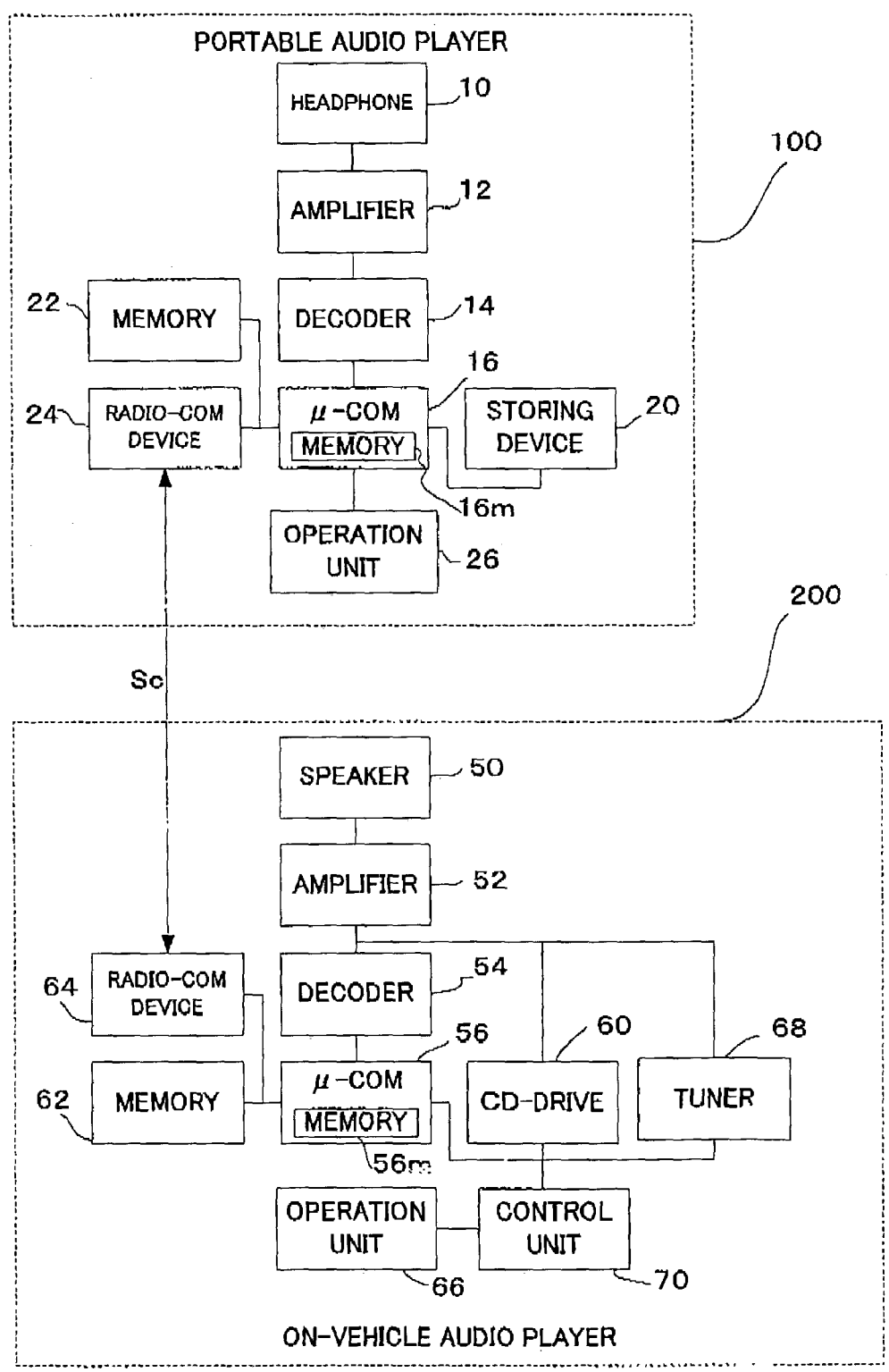
FIG. 1 is a block diagram illustrating a set of electronic apparatuses according to a first embodiment of the present invention.

First, the set of electronic apparatuses according to a first embodiment will now be discussed, with referring to FIG. 1. FIG. 1 is a block diagram illustrating the set of electronic apparatuses.

As shown in FIG. 1, the set of electronic apparatuses is provided with a portable audio player 100 as an exemplary first electronic apparatus and an on-vehicle audio player 200 as an exemplary second electronic apparatus.

As illustrated in the upper part of FIG. 1, the portable audio player 100 includes a headphone 10, an amplifier 12, a decoder 14, a microcomputer (μ-COM) 16, a storing device 20, a memory 22, a radio communication (RADIO-COM) device 24 and an operation unit 26.

The headphone 10 is operative to output the sound wave of an electric audio signal obtained from the amplifier 12. Alternatively, an earphone or a speaker may be employed instead of the headphone. The amplifier 12 is operative to amplify the analog audio signal and send it to the headphone 10. The decoder 14 is operative to decode a digital audio data supplied via the microcomputer into an analog audio data and send it to the amplifier 12.

According to this embodiment, an exemplary first reproducing device according to the present invention consists of the headphone 10, the amplifier 12 and the decoder 14.

The microcomputer 16 is operative to control the portable audio player 100 on the whole The storing device 20 may be a device including a removable recording medium such as a CD, a DVD, an MD, a memory stick or a memory card. Alternatively, it may be a device including a non-removable recording medium such as a hard disk or RAM. The storing device 20 is operative to store the digital audio data obtained by digitalizing the audio information including a plurality of music compositions or music albums as the contents information. Preferably, the storing device 20 stores and indexes the audio data so as to facilitate the searching of the audio data, and also stores the music list for the selection of the music.

The audio data stored in the storing device 20 is supplied to the decoder 14 via the microcomputer 16, during the reproduction of the portable audio player 100. On the other hand, the audio data stored in the storing device 20 is supplied to the radio communication device 24 via the microcomputer 16, in case that the communicational connection is established between the portable audio player 100 and the on-vehicle audio player 200.

The memory 22 is a known memory such as a RAM (Random Access Memory) for the high speed processing of the microcomputer 16, and is operative to provide a workspace for the computer program or to store the computer program. Furthermore, it is designed to store temporarily the audio data read from the storing device 20, for the reproduction or the transmission, i.e. prior to the decoding by the decoder 14 or prior to the transmission by the radio communication device 24.

Particularly in this embodiment, an exemplary first controlling device according to the present invention consists of the microcomputer 16, and an exemplary first recording medium consists of the storing device 20.

The radio communication device 24 as an exemplary first communication device is designed for the bidirectional communication on the basis of a communication protocol such as the Bluetooth. Alternatively, the radio communication device 24 may be constructed with a wireless LAN on the basis of a communication protocol such as IEEE 802.11. It is noted that any type of NFC (Near Field Communication) is applicable to the radio communication device according to the present invention.

The operation unit 26 includes a display device such as an LCD (Liquid Crystal Display) or an EL (Electro-Luminescence) display, and an operation panel such as a touch panel, button or key. The operation unit 26 is designed to allow the user to input the command for the operation of the portable audio player 100 and to monitor the operation.

The microcomputer 16 contains a non-volatile memory 16m, into which an identification code for identifying the individual on-vehicle audio player 200 otherwise the individual stationary audio player is recorded, in correlation with a connection requirement data to define the requirement for the connection with the individual on-vehicle audio player 200 or the like.

As shown in the lower part of FIG. 1, the on-vehicle audio player 200 is provided with a speaker 50, an amplifier 52, a decoder 54, a microcomputer (μ-COM) 56) a CD drive 60, a memory 62, a radio communication device 64, an operation unit 66, a tuner 68 and a control unit 70.

The speaker 50 is operative to output the sound wave of an electric audio signal supplied from the amplifier 52. The amplifier 52 is operative to amplify the analog audio signal and send it to the speaker. The decoder 54 is designed to decode a digital audio data into an analog audio data and send it to the amplifier 52.

Particularly in this embodiment, an exemplary second reproducing device according to the present invention consists of the speaker 50, the amplifier 52 and the decoder 54.

The microcomputer 56 is operative especially to control the reproduction of the received contents information at the on-vehicle audio player 200.

Into the CD drive 60, a CD storing audio data obtained by digitalizing the audio information including a plurality of music compositions or music albums as the contents information is set or loaded. Alternatively, a DVD drive or a CD-DVD compatible drive may be employed instead of or in addition to the CD drive 60. Furthermore, the CD drive 60 may read a computer program for the operation of the microcomputer 56 as discussed below, from a CD storing the computer program.

The memory 62 is a known memory such as a RAM (Random Access Memory) for the high speed processing of the microcomputer 56, and is operative to provide a workspace for the computer program or to store the computer program. Furthermore, it is designed to store temporarily the audio data read from the CD drive 60 or the audio data received at the radio communication device 64, for the reproduction or the receiving purpose.

Particularly in this embodiment, an exemplary second controlling device according to the present invention is embodied in the microcomputer 56, and an exemplary second recording medium is embodied in the memory 62.

The radio communication device 64 as an exemplary second communication device may be designed for the bidirectional communication on the basis of the communication protocol such as the Bluetooth.

The operation unit 66 includes a display device such as an LCD or an EL display, and an operation panel such as a touch panel, button or key. The operation unit 66 is designed to allow the user to input the command for the operation of the on-vehicle audio plier 200 and to monitor the operation. The operation unit 66 may be designed for inputting a certain kind of command to the control unit 70, or may be designed for inputting a certain kind of command to the microcomputer 56.

The microcomputer 56 contains a non-volatile memory 56m, into which an identification code for identifying the individual portable audio player 100 is recorded, in correlation with a connection requirement data to define the requirement for the connection with the individual portable audio player 100.

The tuner 68 is operative, under control of the control unit 70, to selectively receive the radio wave of a certain frequency for radio broadcasting and send the analog audio data to the amplifier 52.

The control unit 70 is operative to control the CD drive 60, the tuner 68 and the microcomputer 56, in accordance with the command input from the operation unit 66. It is noted that the microcomputer 56 and the control unit 70 may be formed in a single microcomputer.

Particularly in this embodiment relating to FIG. 1, when the portable audio player 100 comes in the vicinity of the on-vehicle audio player 200 within the predetermined distance therebetween, the bidirectional radio communicational connection is established between the microcomputer 16 in the portable audio player 100 and the microcomputer 56 in the on-vehicle audio player via the radio communication devices 24 and 64, for example, on the basis of the Bluetooth technology for example. The microcomputer 16 in the portable audio player 100 controls starting or stopping the reproduction of the audio data executed by the decoder 14 and other devices, while the microcomputer 56 in the on-vehicle audio player 200 controls starting or stopping the reproduction of the audio data executed by the decoder 54 and other devices. A control signal Sc is transferred between the microcomputers 16 and 56 via the radio communication devices 24 and 64 so that the reproduction of the audio data executed by the decoder 54 and other devices is started under control of the microcomputer 56, when the reproduction of the audio data executed by the decoder 14 and other devices is stopped under control of the microcomputer 16. Moreover, when the reproduction of the audio data executed by the decoder 14 and other devices in the portable audio player 100 is stopped, the radio communication device 24 sends the audio data read from the storing device 20 via the memory 22 or directly to the radio communication device 64 in the on-vehicle audio player 200. Furthermore, the decoder 54 and other devices in the on-vehicle audio player 200 are designed to reproduce, via the memory 62 or directly, the audio data received at the radio communication device 64.

A computer program for serving the microcomputer 16 in the portable audio player 100 as the first controlling device according to the present invention for the control operation as discussed below may be stored in the storing device 20, the memory 22 or the like, otherwise may be downloaded via the radio communication device 24 or the like.

A computer program product for serving the microcomputer 56 in the on-vehicle audio player 200 as the second controlling device according to the present invention for the control operation as discussed below may be stored in the CD in the CD drive 60, the memory 62 or the like, otherwise may be downloaded via the radio communication device 64 or the like.

Figure 2:
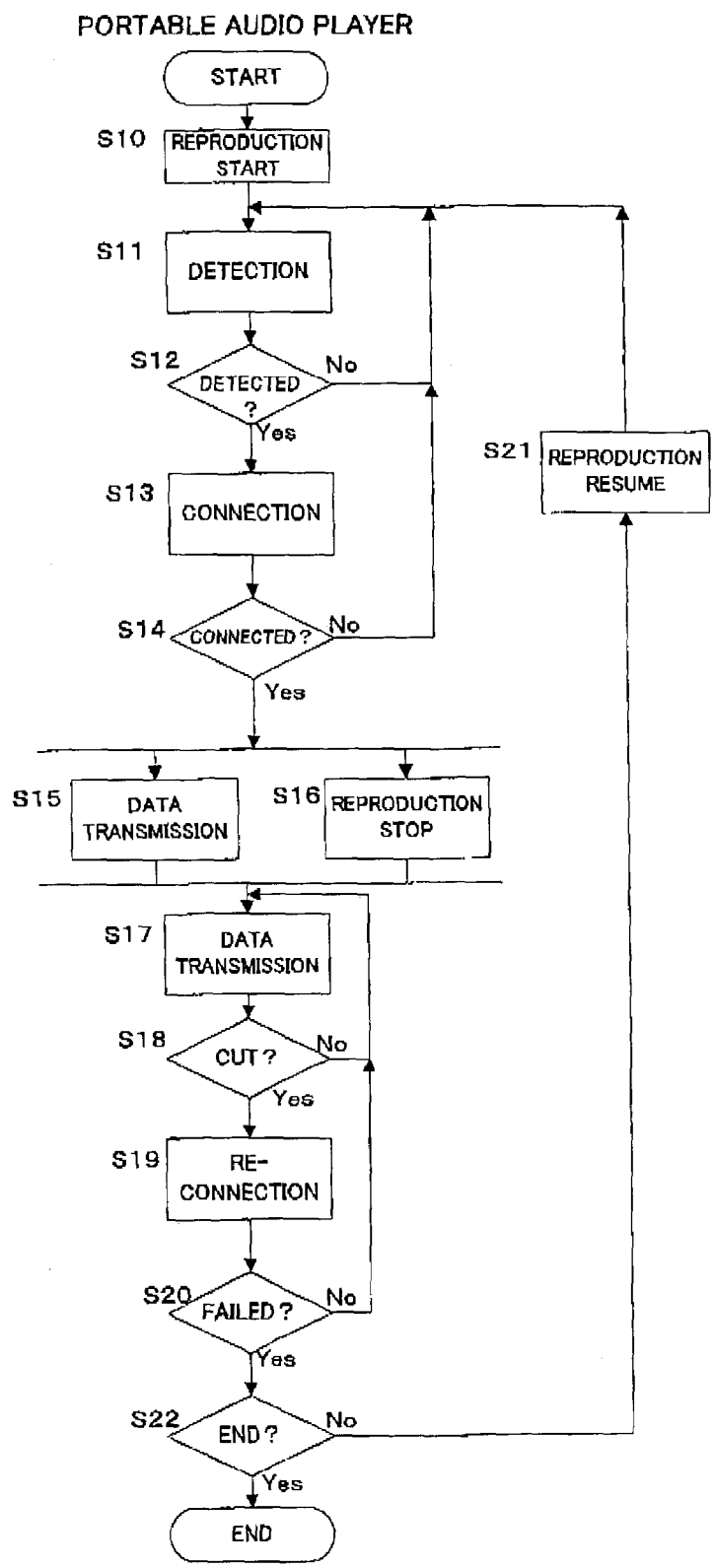
FIG. 2 is a flow chart illustrating the operation of a portable audio player as a component of the set of electronic apparatuses according to the first embodiment.
Figure 3:
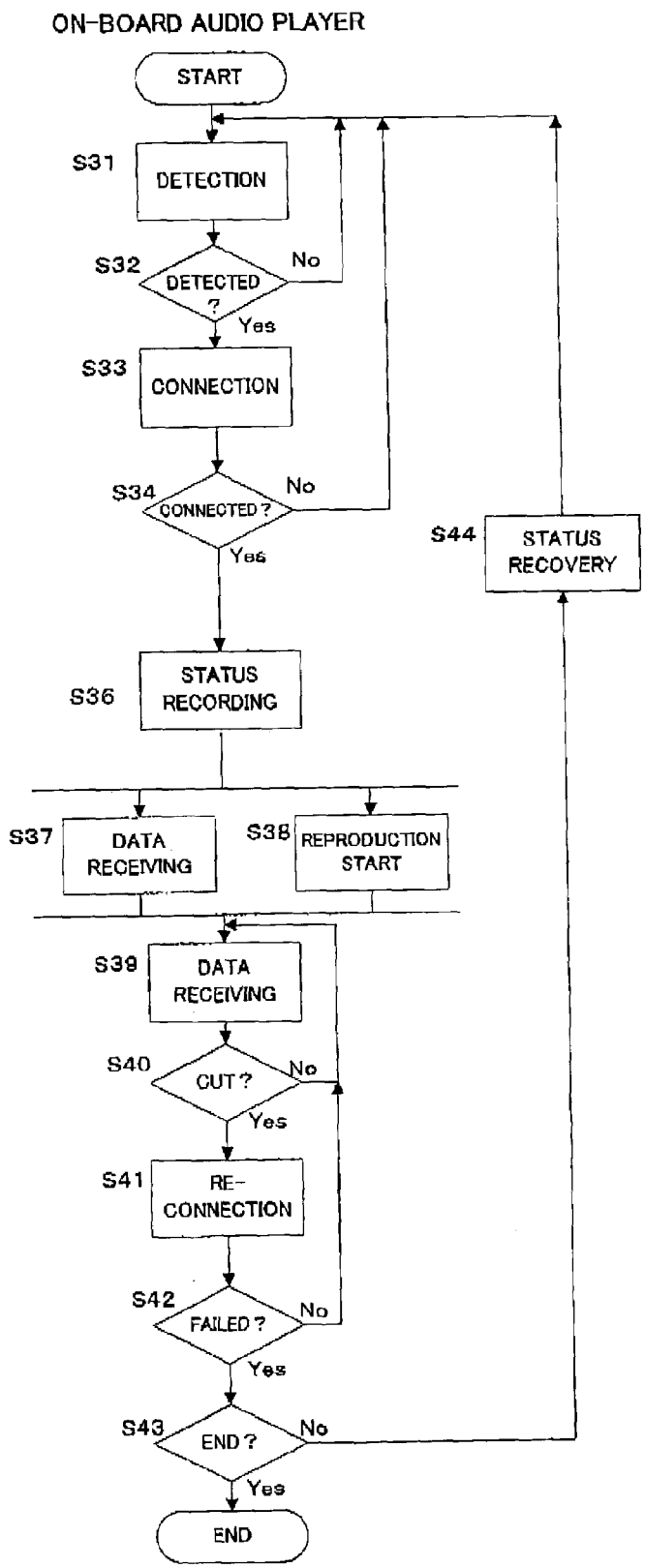
FIG. 3 is a flow chart illustrating the operation of an on-vehicle audio player as a component of the set of electronic apparatuses according to the first embodiment.

Next, the operation of this embodiment will now be discussed, with referring to FIG. 2 and FIG. 3. FIG. 2 is a flow chart illustrating the operation of the portable audio player 100, and FIG. 3 is a flow chart illustrating the operation of the on-vehicle audio player 200. The invention will be explained, herein, about the exemplary situation wherein the user enjoys the contents information with the portable audio player 100 in the open air, and then moves into a car on which the on-vehicle audio player 200 is mounted.

Firstly, in the portable audio player 10 of FIG. 2, desired data is read among the audio data stored in the storing device 20 under control of the microcomputer 16 in accordance with the command from the operation unit 26 to resume the reproduction. Then, the read audio data is supplied to the decoder 14 via the memory 22 acting as a buffer. Next, the reproduction of the audio data is executed by the decoder 14, the amplifier 12 and the headphone 10 (step S10). Thereby, the user can enjoy music via the headphone 10 while walking, for example.

During this enjoyment of music, a detection process of detecting the existence of the on-vehicle audio player 200 is executed regularly or irregularly (step S11), and it is judged whether or not the on-vehicle audio player 200 is detected (step S12). Herein, this detection process is executed, for example, between the radio communication device 24 and the radio communication device 64, depending on the accessibility of the radio wave for the radio communication above the predetermined intensity. Additionally or alternatively, a device for electromagnetically, optically or physically detecting the distance between the portable audio player 100 and the on-vehicle audio player 200 may be further disposed in the portable audio player 100.

Unless the existence of the on-vehicle audio player 200 is detected (step S12: NO), the reproduction in the portable audio player 100 is continued as usual.

On the other hand, if the existence of the on-vehicle player 200 is detected (step S12: YES), the connection between the microcomputer 16 and the microcomputer 56 is attempted via the radio communication devices 24 and 64 (step S13). Herein the control signal is transferred bidirectionaly to establish the communicational connection between the microcomputer 16 and the microcomputer 56, for example, the authentication of the identification code assigned to each of the corresponding players is executed. For example, if the identification code of the detected player does not match with the identification code already registered in the non-volatile memory 16m, as indicating the corresponding audio player 200 of the user's own, the connection is not established because the mismatch of the identification code means that the detected player is not the one of the user's own.

Then, if the connection is not established (step S14: NO), the process goes back to the step S11 to continue the reproduction in the portable audio player 100 as usual, with the detection of the existence of the on-vehicle audio player 200.

On the other hand, if the connection is established between the microcomputers 16 and 56 (step S14. YES), the audio data stored in the memory 22 or further read into the memory 22 from the storing device 20 is transmitted from the radio communication device 24 (step S15). Simultaneously or substantially simultaneously, the reproduction of the audio data is stopped after only a part of the audio data stored in the memory 22 is reproduced (step S16). Owing to the existence of the data transmitted at the step S15, the players can be switched without the discretion of the reproduced audio data. That is, the reproduction in the on-vehicle audio player 200 is started as discussed below, in correspondence with the data transmission (step S15) and the stop of the reproduction (step S16).

Even after the reproduction executed by the decoder 14 and other devices is stopped, the data transmission is continued (step S17).

Then, the microcomputer 16 monitors whether or not the communicational connection once established between the microcomputers 16 and 56 is cut due to the weakening of the radio wave (step S18). Unless the connection is cut (step S18: NO), the transmission of the audio data at the step S17 is continued.

On the other hand, the communicational connection between the microcomputers 16 and 56 is cut due to the weakening of the radio wave (step S18: YES), the re-connection is attempted first (step S19). During the attempt of the re-connection, since the on-vehicle audio player 200 can continue reproducing an amount of the audio data already transmitted from the radio communication device 24 and received at the radio communication device 64 to be stored in the memory 62, the sudden discretion of the reproduction is avoided.

Then, if the attempt of the re-connection does not fail (step S20: NO), the reproduction in the on-vehicle audio player 200 is possible and the process goes back to the step S17 to transfer the data.

On the other hand, the attempt of the re-connection fails (step S20: YES), the reproduction in the on-vehicle audio player 200 is not possible, and it is judged whether or not the reproduction of the audio data is to be stopped in the portable audio player 100, for example, on the basis of the input of the stop command (step S22).

If it is judged that the reproduction is to be stopped (step S22: YES), the portable audio player 100 stops a series of reproduction and transmission.

On the other hand, if it is judged that the reproduction is not to be stopped (step S22: NO), the portable audio player 100 starts again supplying the audio data under reproduction from the memory 22 to the decoder 14, instead of transmitting it from the memory 22 via the radio communication device 24. Thereby, the reproduction of the audio data executed by the decoder 14, the amplifier 12 and the headphone 10 is resumed without the discretion (step S21). Then the processes after the step S11 are repeated, The players can be switched comparatively readily without the discretion of the reproduced audio data, by simultaneously executing the stopping and resuming of the reproduction before both buffers are emptied, while serving the memory 22 in the portable audio player 100 and the memory 62 in the on-vehicle audio player 200 as buffers, as discussed above.

As shown in FIG. 3, in the on-vehicle audio player 200, firstly, a detection process of detecting the portable audio player 100 is executed regularly or irregularly under the control of the microcomputer 56, for example, when the power for the player is turned on (step S31), and it is judged whether or not the portable audio player 100 is detected (step S32). This detection process herein is executed, for example, between the radio communication device 64 and the radio communication device 24, depending on the accessibility of the radio wave for the radio communication above the predetermined intensity. Additionally or alternatively, a device for electromagnetically, optically or physically detecting the distance between the portable audio player 100 and the on-vehicle audio player 200 may be further disposed in the on-vehicle audio player 200.

Unless the existence of the portable audio player 100 is detected (step S32: NO), the detection in the on-vehicle audio player 200 is continued.

On the other hand, the existence of the portable audio player 100 is detected (step S32: YES), the connection between the microcomputer 56 and the microcomputer 16 is attempted via the radio communication devices 64 and 24 (step S33). Herein the control signal is transferred bidirectionaly to establish the communicational connection between the microcomputer 56 and the microcomputer 16, for example, the authentication of the identification code assigned to each of the corresponding players is executed.

Then, if the connection is not established (step S34: NO), the process goes back to the step S31 to continue the detection process in the on-vehicle audio player 200.

On the other hand, the connection is established between the microcomputers 56 and 16 (step S34: YES), the status data indicating (i) the source type such as a CD, a DVD, a cassette tape, a radio and so on, which has been reproduced in the on-vehicle audio player 200 until that time, and (ii) the operating status, such as the reproduction status, in the on-vehicle audio player 200 are stored into the memory 62 or the like (step S36). For example, the status data indicating which part, which number and which CD itself is in the reproduction is stored.

Simultaneously or substantially simultaneously with the start of receiving the data at the radio communication device 64 (step S37), the reproduction of the received audio data is started (step S38). Specifically, the audio data received at the radio communication device 64 is supplied to the decoder 54 via the memory 62 as a buffer. Thereby, the reproduction of the received audio data is started by the decoder 54, the amplifier 52 and the speaker 50. The audio data following the point at which the portable audio player 100 stopped the output of the audio data from the headphone 10 is continuously outputted as a sound wave from the speaker 50. Thereby, the players can be switched over without the discretion of the reproduced sound.

The players can be switched comparatively readily without the discretion of the reproduced audio data, by simultaneously executing the stopping and resuming of the reproduction before both buffers are emptied, while serving the memory 22 in the portable audio player 100 and the memory 62 in the on-vehicle audio player 200 as buffers, as discussed above.

Even after the reproduction in the portable audio player 100 is completely stopped, the data transmission is continued while the reproduction of the audio data is continued (step S39).

Under these circumstances, the microcomputer 56 monitors the available space within the memory 62 and requests to the microcomputer 16 in the portable audio player 100 regularly or irregularly via the radio communication devices 64 and 24 for transmitting the data to maintain the available space optimal. Furthermore, the data may be transmitted in a desired unit such as music composition by music composition, album by album, or data within a range of a certain seconds or minutes.

Then, the microcomputer 56 also monitors whether the communicational connection once established between the microcomputers 56 and 16 is cut due to the weakening of the radio wave (step S40). Unless the connection is cut (step S40: NO), the reception of the audio data at the step S39 is continued.

On the other hand, if the communicational connection between the microcomputers 56 and 16 is cut due to the weakening of the radio wave (step S40: YES), the re-connection is attempted first (step S41). During the attempt of the re-connection, since the on-vehicle audio player 200 can continue reproducing an amount of the audio data already received at the radio communication device 64 and stored in the memory 62, the sudden discretion of the reproduction is avoided.

Then, if the attempt of the re-connection does not fail (step S42: NO), the process goes back to the step S39 to transfer and reproduce the data.

On the other hand, the attempt of the re-connection fails (step S42: YES), the reproduction using the data from the portable audio player 100 is not possible and it is judged whether or not the reproduction of the audio data is to be stopped in the on-vehicle audio player 200, on the basis of the input of the stop command or the like (step S43).

If it is judged that the reproduction is to be stopped (step S43: YES), the on-vehicle audio player 200 stops a series of reproduction and receiving.

On the other hand, if it is judged that the reproduction is not to be stopped (step S43: NO), the operational flow returns to the operation at the establishment of the connection at the step S34 to resume the reproduction of the CD, the radio receiving or the like (step S44). Since the status data is recorded at the step S36 as discussed above, going back to the previous operation and continuing the same operation can be executed comparatively readily. For example, on the basis of the status data, the reproduction of the audio data may be resumed from a certain part of a certain music composition of a certain CD whose reproduction is stopped at the step S37.

Then going back to the step S31, the detection process of the portable audio player 100 is again executed.

According to the first embodiment, as discussed above in detail, in a situation that the user enjoying the audio data with the portable audio player 100 gets into the car mounted the on-vehicle audio player 200, the user can enjoy the audio data in mid course of the reproduction continuously with the on-vehicle audio player 200, avoiding the bothersome manual operation.

In addition, the portable audio player 100 or the on-vehicle audio player 200 according to the embodiment set forth above can be readily feasible by running the computer program for making the microcomputer 16 or the microcomputer 56 control the stop and start of the reproduction. Specifically, they can be embodied in running the computer program after loading it from the recording medium such as a CD, a DVD or the like, or after downloading it via the communication network.

(Second Embodiment)

Figure 4:
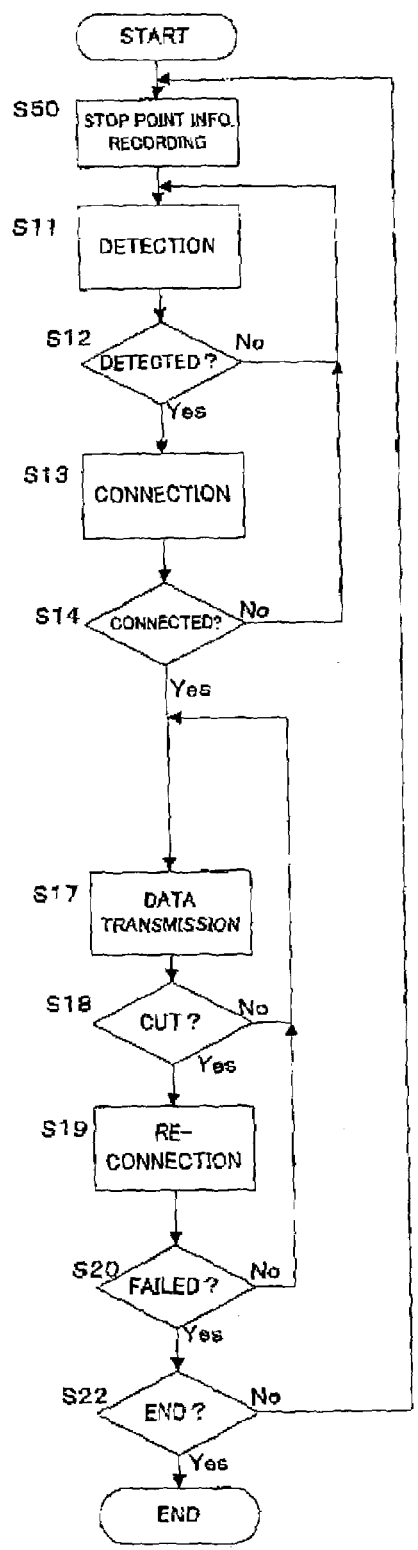
FIG. 4 is a flow chart illustrating the operation of a portable audio player as a component of a set of electronic apparatuses according to a second embodiment of the present invention.

The second embodiment of the present invention will now be discussed, referring to FIG. 4. FIG. 4 is a flow chart illustrating the operation of the portable audio player 100 according to the second embodiment. In FIG. 4, the same processes as those in the first embodiment shown in FIG. 2 carry the same reference numerals, and the explanations thereof are omitted as appropriate.

The second embodiment is differs from the first embodiment in the controlling scheme of the microcomputer 16 in the portable audio player 100. Specifically, the second embodiment is constructed in such a manner that the reproduction of the audio data, which has already been stopped at an arbitrary point by the user, is resumed from the point, at which the reproduction has stopped, with the on-vehicle audio player 200, instead of starting the reproduction of the audio data in the on-vehicle audio player 200 simultaneously with stopping the reproduction of the audio data in the portable audio player 100 as in the case of the first embodiment. Other construction and operation is the same as the first embodiment set forth above.

Namely as shown in FIG. 4, in the portable audio player 100 firstly, the stop position information indicating the stop position at which the reproduction of the audio data has been stopped at the user's convenience is stored in correlation with the audio data, into a memory such as the non-volatile memory 16m in the microcomputer 16 (step S50). For example, the stop position information indicating the stop position is stored with the data indicating which part, which music composition or which CD itself.

Then the processes of the steps S11 to S14 as discussed in the first embodiment are executed, and once the connection between the portable audio player 100 and the on-vehicle audio player 200 is established at the step S14 (step S14: YES), the process goes to the step S17 to transfer the data. Thereby, in the on-vehicle audio player 200, the reproduction of the audio data is started from the point at which the reproduction of the audio data has been stopped in the portable audio player 100, From then on, the processes of the steps S18 to S22 as discussed in the first embodiment are executed.

Particularly, the transmission of the data at the step S17 is for transmitting the audio data following the stop point indicated by the stop point information recorded at the step S50. Thereby, the processing in the on-vehicle audio player 200 sufficiently consists of receiving the audio data transmitted from the radio communication device 24 and reproducing the audio data without special attention to the stop point.

However, the transmission of the data at the step S17 may be for transmitting the audio data with the stop point information as string and the on-vehicle audio player 200 may reproduce the audio data from the point indicated by the stop point information.

According to the second embodiment as discussed above, in a situation that the user enjoying the audio data with the portable audio player 100 stops the reproduction of the audio data, for example, moving into an noisy area or meeting someone or taking a conversation with someone, and then gets into the car on which the on-vehicle audio player 200 is mounted, the user can continuously enjoy the audio data, whose reproduction has never been completed and whose reproduction is not redundant, with the on-vehicle audio player 200 avoiding a bothersome manual operation and/or a waste repeating of the reproduction of the same data.

As an application of the second embodiment, the user can reproduce the audio data stored in the storing device 20, by no or almost no reproduction in the portable audio player 100, but only by one or more on-vehicle audio players 200 or by a stationary audio player disposed in the house or a facility.

(Third Embodiment)

Figure 5:
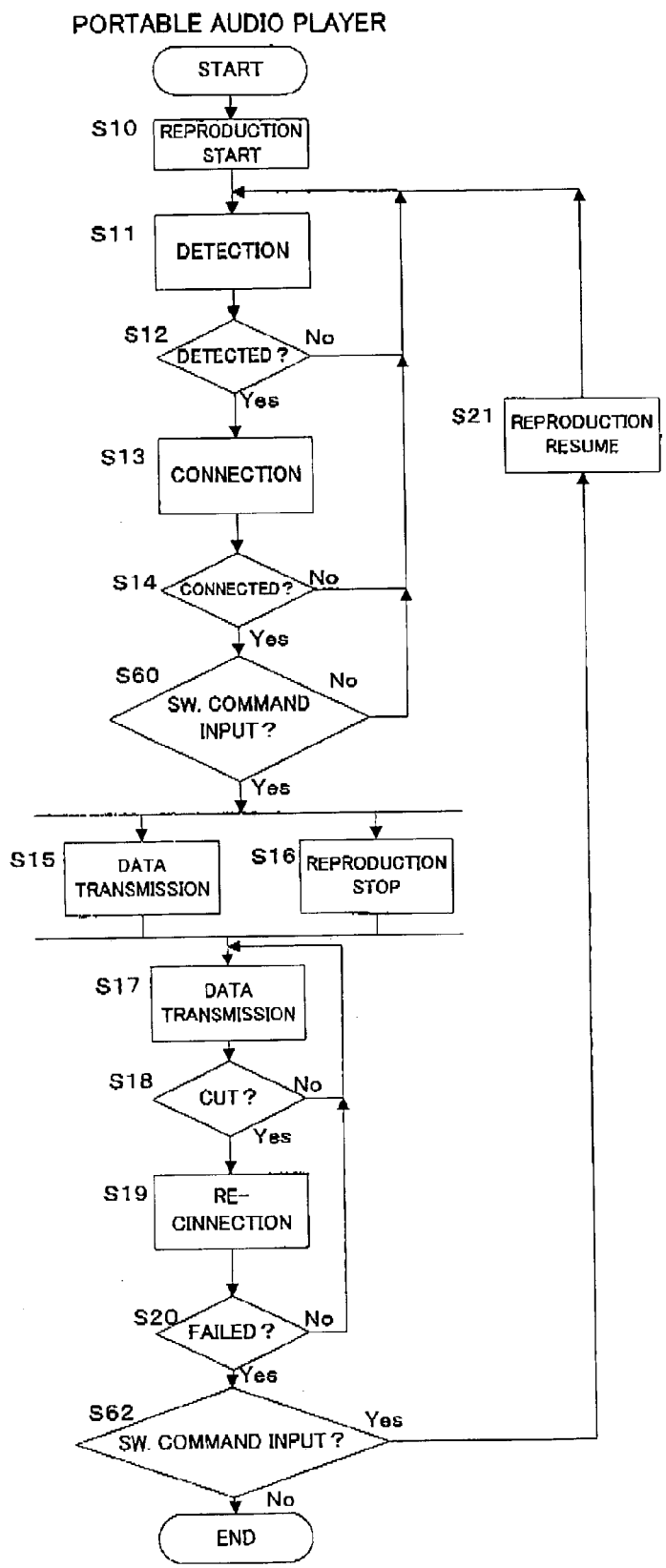
FIG. 5 is a flow chart illustrating the operation of a portable audio player as a component of a set of electronic apparatuses according to a third embodiment of the present invention.

The third embodiment will now be discussed, referring to FIG. 5. FIG. 5 is a flow chart illustrating the operation of the portable audio player 100 according to the third embodiment. In FIG. 5, the same processes as those in the first embodiment shown in FIG. 2 carry the same reference numerals and the explanations thereof are omitted as appropriate.

The third embodiment is differs from the first embodiment in the controlling scheme of the microcomputer 16 in the portable audio player 100. Specifically, the third embodiment is constructed in such a manner that, instead of automatically switching players at a point when the situation is ready for switching players as the first embodiment, the process of inquiring the user's selection is executed in the portable audio player 100 at that point and at another point when the communicational connection is cut. Other construction and operation is the same as the first embodiment as discussed above.

That is, as shown in FIG. 5, after the execution of the processes of the steps S10 to S14 as discussed in the first embodiment and the establishment of the connection between the portable audio player 100 and the on-vehicle audio player 200 at the step S14, for example, the user is prompted to input a command by a beep to indicate the establishment of the connection (step S14), and then it is judged whether or not the switching command is inputted from the operation unit 26 in the portable audio player 100 (step S60). Herein, for example, if a predetermined command to switch the players is inputted, it may be judged that the switching command is inputted, or if a predetermined command not to switch the players is not inputted, it may be judged that the switching command is inputted. Alternatively, if a command to switch the players according to a predetermined rule or mode is not inputted within the predetermined period, it may be judged as default that the switching command is inputted or is not inputted.

In this step S60, if the switching command is not inputted (step S60: NO), the process goes back to the step S11 without switching the players.

On the other hand, at the step S60, if the switching command is inputted (step S60: YES), the processes of the steps S15 to S20 as discussed in the first embodiment are executed. Thereafter, if the attempt of the re-connection fails at the step S20 (step S20: YES), it is judged whether or not the switching command is inputted from the operation unit 26 in the portable audio player 100 (step S62). Then, if the switching command is inputted (step S62: YES), the process of the step S21 as discussed in the first embodiment is executed. On the other hand, if the switching command is not inputted (step S62. NO), the portable audio player 100 stops a series of reproduction and transmission.

According to the third embodiment as discussed above, in a situation that the user enjoying the audio data with the portable audio player 100 gets into the car mounted the on-vehicle audio player 200, the user can continuously enjoy the audio data, whose reproduction has never been completed, with the on-vehicle audio player 200 avoiding totally or almost totally bothersome manual operations. Furthermore, the undesirable switching of the players can be avoided by reflecting the user's selection for the switching of the players into the switching operation.

(Fourth Embodiment)

Figure 6:
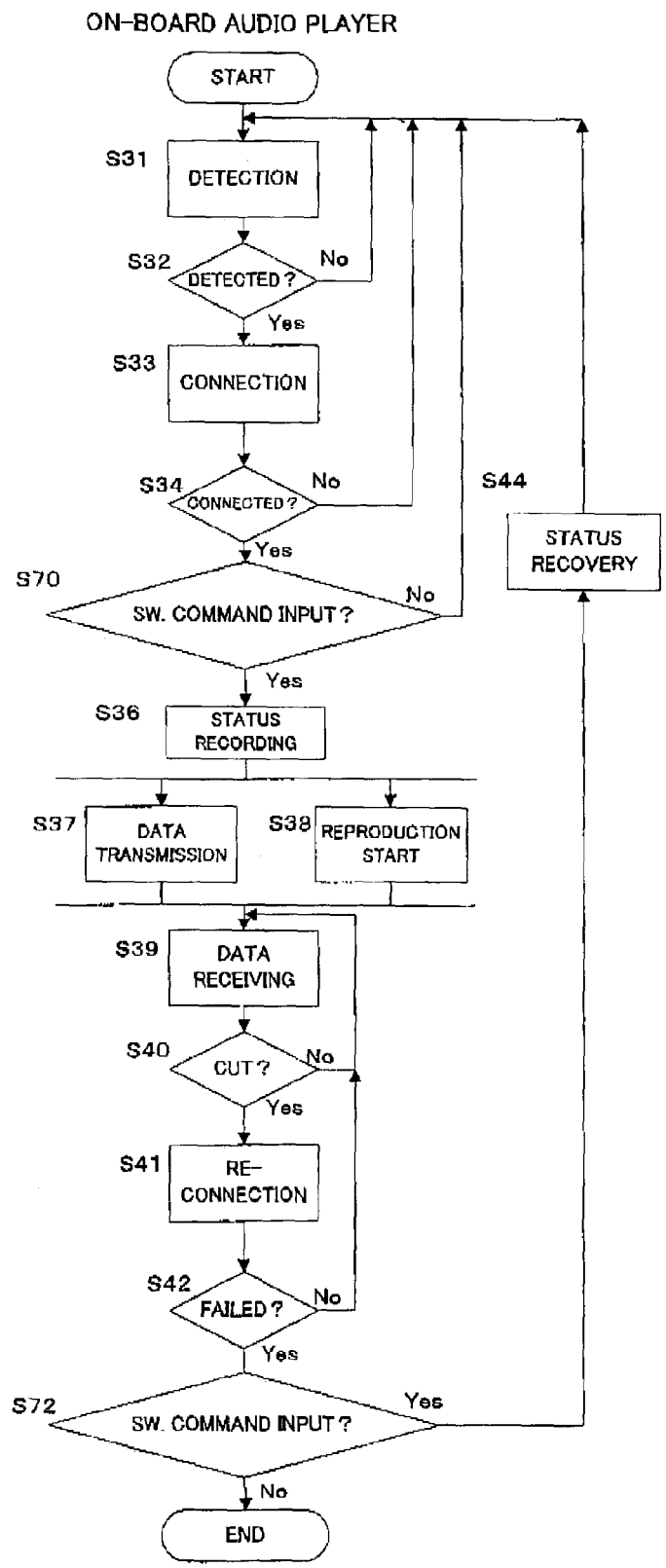
FIG. 6 is a flow chart illustrating the operation of an on-vehicle audio player as a component of a set of electronic apparatuses according to a fourth embodiment of the present invention.

The fourth embodiment will now be discussed, referring to FIG. 6. FIG. 6 is a flow chart illustrating the operation of the on-vehicle audio player 200 according to the fourth embodiment. In FIG. 6, the same processes as those in the first embodiment shown in FIG. 3 carry the same reference numerals and the explanations thereof are omitted as appropriate.

The fourth embodiment is differs from the first embodiment in the controlling scheme of the microcomputer 56 in the on-vehicle audio player 200. Specifically, the fourth embodiment is constructed in such a manner that, instead of automatically switching players at a point when the situation is ready for switching players as the first embodiment, the process of inquiring the user's selection is executed in the on-vehicle audio player 200 at that point and at another point when the communicational connection is cut. Other construction and operation is the same as the first embodiment as discussed above.

That is, as shown in FIG. 6, after the execution of the processes of the steps S31 to S34 as discussed in the first embodiment and the establishment of the connection between the portable audio player 100 and the on-vehicle audio player 200 at the step S34, for example, the user is prompted to input a command by a beep to indicate the establishment of the connection (step S34: YES), and then it is judged whether or not the switching command is inputted from the operation unit 66 in the on-vehicle audio player 200 (step S70). Herein, for example, if a predetermined command to switch the players is inputted, it may be decided that the switching command is inputted, or if a predetermined command not to switch the players is not inputted, it may be decided that the switching command is inputted. Alternatively, if a command to switch the players according to a predetermined rule or mode is not inputted within a predetermined period, it may be judged as default that the switching command is inputted or is not inputted.

At this step S70, if the switching command is not inputted (step S70: NO), the process goes back to the step S31 without switching the players.

On the other hand, if the switching command is inputted (step S70: YES), the processes of the steps S36 to S42 as discussed in the first embodiment are executed. Thereafter, if the attempt of the re-connection fails at the step S42 (step S42: YES), it is judged whether or not the switching command is inputted from the operation unit 66 in the on-vehicle audio player 200 (step S72). Then, if the switching command is inputted (step S72: YES), the process of the step S44 as discussed in the first embodiment is executed. On the other hand, if the switching command is not inputted (step S72: NO), the on-vehicle audio player 200 stops a series of reproduction and transmission.

According to the fourth embodiment as discussed above, in a situation that the user enjoying the audio data with the portable audio player 100 gets into the car mounted the on-vehicle audio player 200, the user can continuously enjoy the audio data, whose reproduction has never been completed, with the on-vehicle audio player 200 avoiding totally or almost totally bothersome manual operations. Furthermore, the undesirable switching of the players can be avoided by reflecting the user's selection for the switching of the players into the switching operation.

(Fifth Embodiment)

The fifth embodiment will now be discussed, referring to FIG. 7. FIG. 7 is a conceptual diagram showing an exemplary construction of a connection authentication table constructed within the non-volatile memory 16m integrated within the microcomputer 16 provided to the portable audio player 100 (see FIG. 1) or within the non-volatile memory 56m integrated within the microcomputer 56 provided to the on-vehicle audio player 200 (see FIG. 1).

The fifth embodiment is differs from the first to fourth embodiments set forth above in that such a connection authentication table is constructed within the memory. Other construction and operation are the same as the first embodiment set forth above.

As shown in FIG. 7, in one exemplary connection authentication table, the self information i.e., the identification number, the model and the connection requirement of the individual audio player 100 itself are registered, in case of the portable audio player 100, or the identification number, the model and the connection requirement of the individual on-vehicle player 200 itself are registered in case of the on-vehicle audio player 200. Additionally, the identification number, the model and the connection requirement of the apparatuses No. 1, No. 2, No. 3 and so forth capable of being connected to the individual apparatus itself are also registered. More specifically, for the table within the memory 16m in the portable audio player 100, the identification number, the model and the connection requirement of the on-vehicle audio player 200 capable of being connected to the portable audio player 100 are registered. On the contrary, for the table within the memory 56m in the on-vehicle audio player 200, the identification number, the model and the connection requirement of the portable audio player 100 capable of being connected to the on-vehicle audio player 200 are registered. This registration may be accomplished by a predetermined operation of the user via the operation unit 26 or 66.

Therefore, according to the fifth embodiment, the connection according to the first to fourth embodiments can be executed in such a manner that the identification number of one audio player is transmitted to the other audio player desired to be connected thereto by reading and transmitting the identification number from the table as shown in FIG. 7. Under these circumstances, on receiving the identification number of the other audio player attempted to be connected thereto from the other audio player, it can be promptly judged whether or not this received identification number has been registered, by referring to the table as shown in FIG. 7. Therefore, it is convenient that the communicational connection can be established automatically and appropriately by using the information included within the table. Furthermore, even if the audio player of the user's own gets near the on-vehicle audio player 200 or the portable audio player 100 of the third party's own, the danger of misconnecting can be reduced.

The "condition requirement" in the table in FIG. 7 may have great variations depending on the individual specification or function for the on-vehicle audio player 200 or the portable audio player 100, such as (i) a priority among audio players to be connected with the audio player of interest in a case of multiple accesses between multiple pairs being possible, (ii) an accessible rang of approach status for the communicational connection, (iii) a model requirement for the connection, (iv) a special requirement for the reproduction after switching, (v) a mode set for permitting or forbidding the automatic connection or the like.

(Other Embodiments)

Each embodiment discussed above is constructed in such a manner that the reproduction in the on-vehicle audio player 200 is started at a point where the reproduction in the portable audio player 100 has been stopped. However, the reproduction in the on-vehicle audio player 200 may be started somewhat before (on the timescale) the point where the reproduction in the portable audio player 100 has been stopped. For example, before or after the switching, the output from the portable audio player 100 and the output from the on-vehicle audio player 200 can overlap by a part corresponding to a predetermined time period. Furthermore, the contents information such as a music composition, the reproduction of which has never been completed in the portable player 100 may be reproduced from the head thereof in the on-vehicle audio player 200.

In embodiments discussed above, although the second electronic apparatus is exemplified in the on-vehicle audio player 200, the second electric device may be a stationary audio player disposed in the user's house otherwise in various facilities such as accommodations, amusement facilities or restaurants. Furthermore, the second electronic apparatus may be a portable audio-video player or an on-vehicle or stationary audio-video player for reproducing not only audio data but also video data as contents information.

According to the present embodiments, as discussed above, the contents information, the reproduction of which has never been completed in the first electronic apparatus such as the portable audio player can be reproduced in the second electronic apparatus such as the on-vehicle or stationary audio player automatically or with a comparatively simple operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-179142 filed on Jun. 19, 2002 including the specification, claims, drawings and summary is incorporated herein by reference in its entirety.

What is claimed is:

1. A set of electronic apparatuses comprising a first electronic apparatus and a second electronic apparatus,
    said first electronic apparatus comprising:
    a first reproducing device for reproducing contents information;
    a first controlling device for controlling starting and stopping a reproduction in said first reproducing device; and
    a first communication device for a radio communication,
    said second electronic apparatus comprising:
    a second communication device for a bidirectional radio communication with said first communication device;
    a second reproducing device for reproducing the contents information; and
    a second controlling device for controlling starting and stopping a reproduction in said second reproducing device,
    wherein a control signal is transferred between said first and second controlling devices via said first and second communication devices so that said second reproducing device starts reproducing the contents information under control of said second controlling device, in case that said first reproducing device stops reproducing the contents information under control of said first controlling device.

2. The set of electronic apparatuses according to claim 1, wherein said first electronic apparatus further comprises a first recording medium for storing the contents information,
    said first reproducing device reads the contents information stored in said first recording medium to reproduce the contents information, upon reproducing the contents information,
    said first communication device reads the contents information stored in said first recording medium to transmit the contents information to said second communication device, in case that said first reproducing device stops reproducing the contents information, and
    said second reproducing device reproduces the contents information received at said second communication device.

3. The set of electronic apparatuses according to claim 2, wherein said second electronic apparatus comprises a second recording medium for storing the contents information received at said second communication device, and
    said second reproducing device reproduces the contents information stored in said second recording medium.

4. The set of electronic apparatuses according to claim 1, wherein, in case that said first reproducing device stops reproducing the contents information, said second reproducing device starts reproducing the contents information such that said first reproducing device and said second reproducing device reproduce the contents information in a continuous manner.

5. The set of electronic apparatuses according to claim 1, wherein said second reproducing device starts reproducing the contents information with an overlap of the contents information by a predetermined amount, or said second reproducing device starts reproducing the contents information at a beginning of a predetermined unit, which includes a stop point at which the reproduction of the contents information is stopped, in case that said first reproducing device stops reproducing the contents information.

6. The set of electronic apparatuses according to claim 1, wherein a communicational connection is established between said first communication device and said second communication device, in case that said first electronic apparatus and said second electronic apparatus come closer to one another to be within a predetermined range of distance therebetween, and
    the control signal is transferred, once the communicational connection is established.

7. The set of electronic apparatuses according to claim 1, wherein, if an approach status between said first electronic apparatus and said second electronic apparatus is detected in accordance with a predetermined standard, the control signal is transferred so that said first reproducing device stops reproducing the contents information and said second reproducing device starts reproducing the contents information.

8. The set of electronic apparatuses according to claim 7, wherein at least one of said first and second controlling devices detects the approach status between said first and second electronic apparatuses, on the basis of a communicational status between said first and second communication devices.

9. The set of electronic apparatuses according to claim 1, wherein at least one of said first and second electronic apparatuses further comprises a detecting device for detecting a predetermined trigger event, and once the predetermined trigger event is detected, the control signal is transferred so that said first reproducing device stops reproducing the contents information and said second reproducing device starts reproducing the contents information.

10. The set of electronic apparatuses according to claim 1, wherein said first electronic apparatus further comprises a first non-volatile memory for storing an identification code for identifying one or more said second electronic apparatuses, and
    said first communication device establishes a radio communication with said second communication device, on the basis of the identification code stored in said first non-volatile memory.

11. The set of electronic apparatuses according to claim 10, wherein said first non-volatile memory stores a connection requirement data, which defines a connection requirement for the connection with said second electronic apparatus, in correlation with the identification code.

12. The set of electronic apparatuses according to claim 1, wherein said second electronic apparatus further comprises a second non-volatile memory for storing an identification code for identifying one or more said first electronic apparatuses, and
    said second communication device establishes a radio communication with said first communication device, on the basis of the identification code stored in said second non-volatile memory.

13. The set of electronic apparatuses according to claim 12, wherein said second non-volatile memory stores a connect requirement data, which defines a connection requirement for the connection with said first electronic apparatus, in correlation with the identification code.

14. The set of electronic apparatuses according to claim 1, wherein, if a separation status between said first electronic apparatus and said second electronic apparatus is detected in accordance with a predetermined standard, said first reproducing device re-starts reproducing the contents information and said second reproducing device stops reproducing the contents information.

15. The set of electronic apparatuses according to claim 1, wherein, if said first and second electronic apparatuses separate from one another departing from a predetermined range of distance therebetween, the communicational connection between said first and second communication devices is cut, and
    once the communicational connection is cut, said first reproducing device re-starts reproducing the contents information and said second reproducing device stops reproducing the contents information.

16. A set of electronic apparatuses comprising a first electronic apparatus and a second electronic apparatus,
    said first electronic apparatus comprising:
    a first reproducing device for reproducing contents information;
    a first controlling device for controlling starting and stopping a reproduction in said first reproducing device; and
    a first communication device for a radio communication,
    said second electronic apparatus comprising:
    a second communication device for a bidirectional radio communication with said first communication device;
    a second reproducing device for reproducing the contents information; and
    a second controlling device for controlling starting and stopping a reproduction in said second reproducing device,
    wherein said first electronic apparatus further comprises a first recording medium for storing a stop point information, which indicates a stop point at which the reproduction of the contents information has been stopped,
    a communicational connection is established, if said first and second electronic apparatuses come closer to one another to be within a predetermined range of distance therebetween,
    once the communicational connection is established, said first communication device transmits at least the stop point information to said second communication device,
    said second communication device receives at least the stop point information, and
    said second reproducing device starts reproducing the contents information under control of said second controlling device, at the stop point obtained from the stop point information received at said second communication device.

17. The set of electronic apparatuses according to claim 16, wherein said first recording medium stores the contents information in correlation with the stop point information,
    once the communicational connection is established, said first communication device transmits the contents information with the stop point information,
    said second communication device receives the contents information transmitted from said first communication device, and
    said second reproducing device starts reproducing the contents information received at said second communication device, from the stop point.

18. A first electronic apparatus for forming a set of electronic apparatuses with a second electronic apparatus comprising a second communication device for a radio communication, a second reproducing device for reproducing contents information and a second controlling device for controlling starting and stopping a reproduction in said second reproducing device,
    said first electronic apparatus comprising:
    a first reproducing device for reproducing the contents information;
    a first controlling device for controlling starting and stopping a reproduction in said first reproducing device; and
    a first communication device for a bidirectional communication with said communication device,
    wherein a control signal is transferred between said first and second controlling devices via said first and second communication devices so that said second reproducing device starts reproducing the contents information under control of said second controlling device, in case that said first reproducing device stops reproducing the contents information under control of said first controlling device.

19. A second electronic apparatus for forming a set of electronic apparatuses with a first electronic apparatus comprising a first reproducing device for reproducing contents information, a first controlling device for controlling starting and stopping a reproduction in said first reproducing device and a first communication device for a radio communication,
    said second electronic apparatus comprising:
    a second communication device for a bidirectional communication with said first communication device;
    a second reproducing device for reproducing the contents information; and a second controlling device for controlling starting and stopping a reproduction in said second reproducing device, wherein a control signal is transferred between said first and second controlling devices via said first and second communication devices so that said second reproducing device starts reproducing the contents information under control of said second controlling device, in case that said first reproducing device stops reproducing the contents information under control of said first controlling device.

20. A computer program product in a computer-readable medium for tangibly embodying a program of instructions executable by a computer to make the computer function as at least one of a first electronic apparatus and a second electronic apparatus for forming a set of electronic apparatuses, said first electronic apparatus comprising:

a first reproducing device for reproducing contents information;

a first controlling device for controlling starting and stopping a reproduction in said first reproducing device; and a first communication device for a radio communication, said second electronic apparatus comprising:

a second communication device for a bidirectional radio communication with said first communication device;

a second reproducing device for reproducing the contents information; and a second controlling device for controlling starting and stopping a reproduction in said second reproducing device, wherein a control signal is transferred between said first and second controlling devices via said first and second communication devices so that said second reproducing device starts reproducing the contents information under control of said second controlling device, in case that said first reproducing device stops reproducing the contents information under control of said first controlling device.

21. A computer program product in a computer-readable medium for tangibly embodying a program of instructions executable by a computer to make the computer function as at least one of a first electronic apparatus and a second electronic apparatus for forming a set of electronic apparatuses, said first electronic apparatus comprising:

a first reproducing device for reproducing contents information;

the first controlling device for controlling starting and stopping a reproduction in said first reproducing device; and a first communication device for a radio communication, said second electronic apparatus comprising:

a second communication device for a bidirectional radio communication with said first communication device;

a second reproducing device for reproducing the contents information; and the second controlling device for controlling starting and stopping a reproduction in said second reproducing device, wherein said first electronic apparatus further comprises a first recording medium for storing a stop point information, which indicates a stop point at which the reproduction of the contents information has been stopped, a communicational connection is established, if said first and second electronic apparatuses come closer to one another to be within a predetermined range of distance therebetween, once the communicational connection is established, said first communication device transmits at least the stop point information to said second communication device, said second communication device receives at least the stop point information, and said second reproducing device starts reproducing the contents information under control of said second controlling device, at the stop point obtained from the stop point information received at said second communication device.

22. A set of electronic apparatuses comprising a first electronic apparatus and a second electronic apparatus, said first electronic apparatus comprising:

a first reproduction circuit that reproduces contents information;

a first control circuit that controls starting and stopping of reproduction of said first reproduction circuit; and a first communication circuit for wireless communication, said second electronic apparatus comprising:

a second communication circuit for bidirectional wireless communication with said first communication circuit;

a second reproduction circuit that reproduces the contents information; and a second control circuit that controls starting and stopping of reproduction of said second reproduction circuit, wherein a control signal is transferred between said first and second control circuits via said first and second communication circuits so that said second reproduction circuit starts reproducing the contents information under control of said second control circuit, in case that said first reproduction circuit stops reproducing the contents information under control of said first control circuit.

23. A set of electronic apparatuses comprising a first electronic apparatus and a second electronic apparatus, said first electronic apparatus comprising:

a first reproduction circuit that reproduces contents information;

a first control circuit that controls starting and stopping reproduction of said first reproduction circuit; and a first communication circuit for wireless communication, said second electronic apparatus comprising:

a second communication circuit for bidirectional wireless communication with said first communication circuit;

a second reproduction circuit that reproduces the contents information; and a second control circuit that controls starting and stopping reproduction of said second reproduction circuit, wherein said first electronic apparatus further comprises a first recording medium for storing stop point information, which indicates a stop point at which the reproduction of the contents information has been stopped, wherein a communicational connection is established, if said first and second electronic apparatuses become within a predetermined range of distance of each other, wherein, once the communicational connection is established, said first communication circuit transmits at least the stop point information to said second communication circuit, wherein said second communication circuit receives at least the stop point information, and wherein said second reproduction circuit starts reproducing the contents information under control of said second control circuit, at the stop point obtained from the stop point information received at said second communication circuit.

24. An electronic apparatus comprising:

a reproduction circuit that reproduces contents information;

a control circuit that controls starting and stopping reproduction of the reproduction circuit; and a communication circuit for a bidirectional communication with an external communication circuit;

wherein, in case that the reproduction circuit stops reproducing contents information, a control signal is transferred between the control circuit and an external control circuit via the communication circuit and the external communication circuit so that an external reproduction circuit starts reproducing the contents information under control of the external control circuit.

25. An electronic apparatus comprising:

a reproduction circuit that reproduces contents information;

a control circuit that controls starting and stopping reproduction of the reproduction circuit; and a communication circuit for a bidirectional communication with an external communication circuit;

wherein, in case that an external reproduction circuit stops reproducing contents information, a control signal is transferred between the control circuit and an external control circuit via the communication circuit and the external communication circuit so that the reproduction circuit starts reproducing the contents information under control of the control circuit.

* * * * *